(No Model.) 5 Sheets—Sheet 1.
W. A. CORNELIUS.
TONGS.
No. 472,436. Patented Apr. 5, 1892.
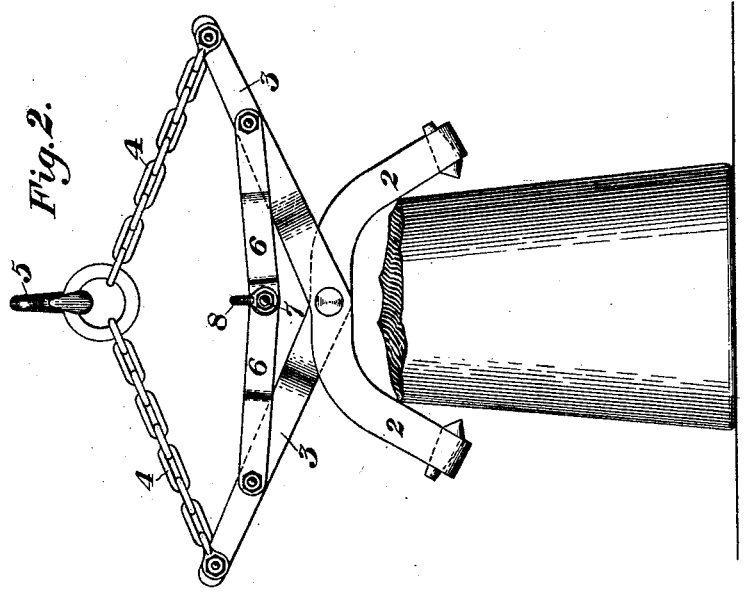
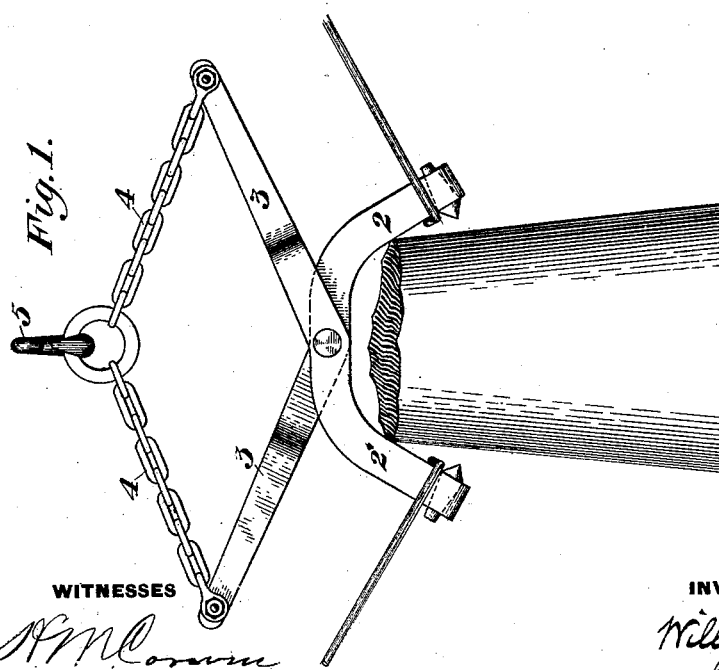
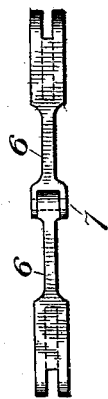
WITNESSES
INVENTOR
William A. Cornelius
by W. Bakewell & Sons
his Attorneys (No Model.) 5 Sheets—Sheet 2.
W. A. CORNELIUS.
TONGS.
No. 472,436. Patented Apr. 5, 1892.
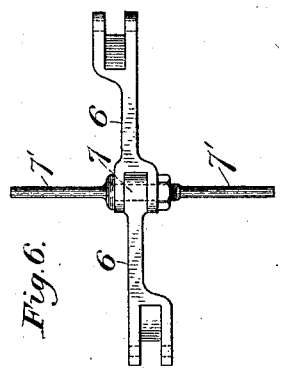
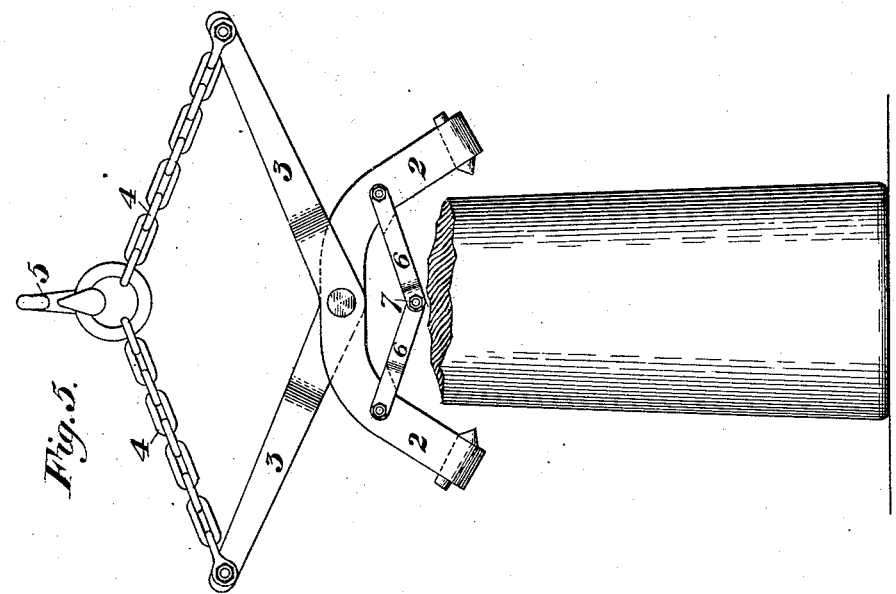
WITNESSES
INVENTOR
William A. Cornelius
by W. Bakewell & Sons
his Attorneys (No Model.)  
W. A. CORNELIUS.  
TONGS.  
No. 472,436. Patented Apr. 5, 1892.  
5 Sheets—Sheet 3.
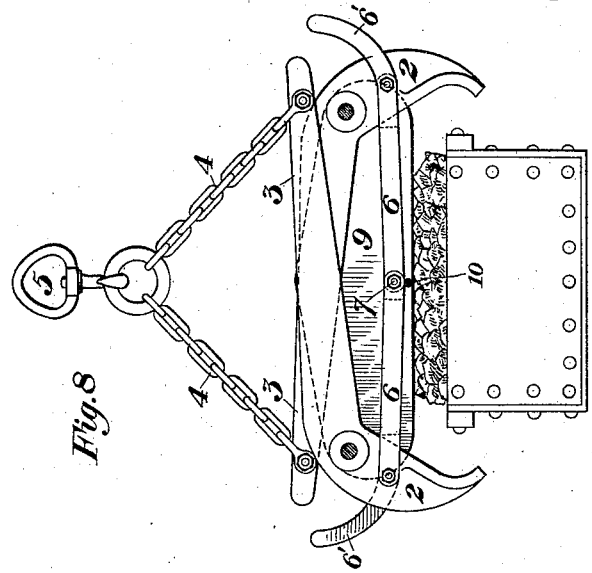
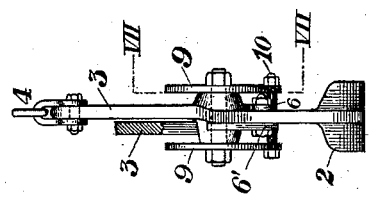
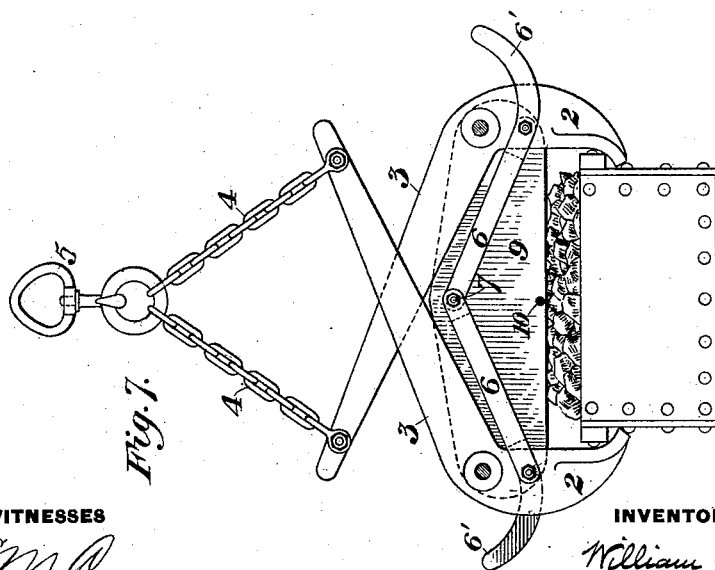
WITNESSES  
INVENTOR  
William A. Cornelius  
by W. Bakewell & Sons  
his Attorneys

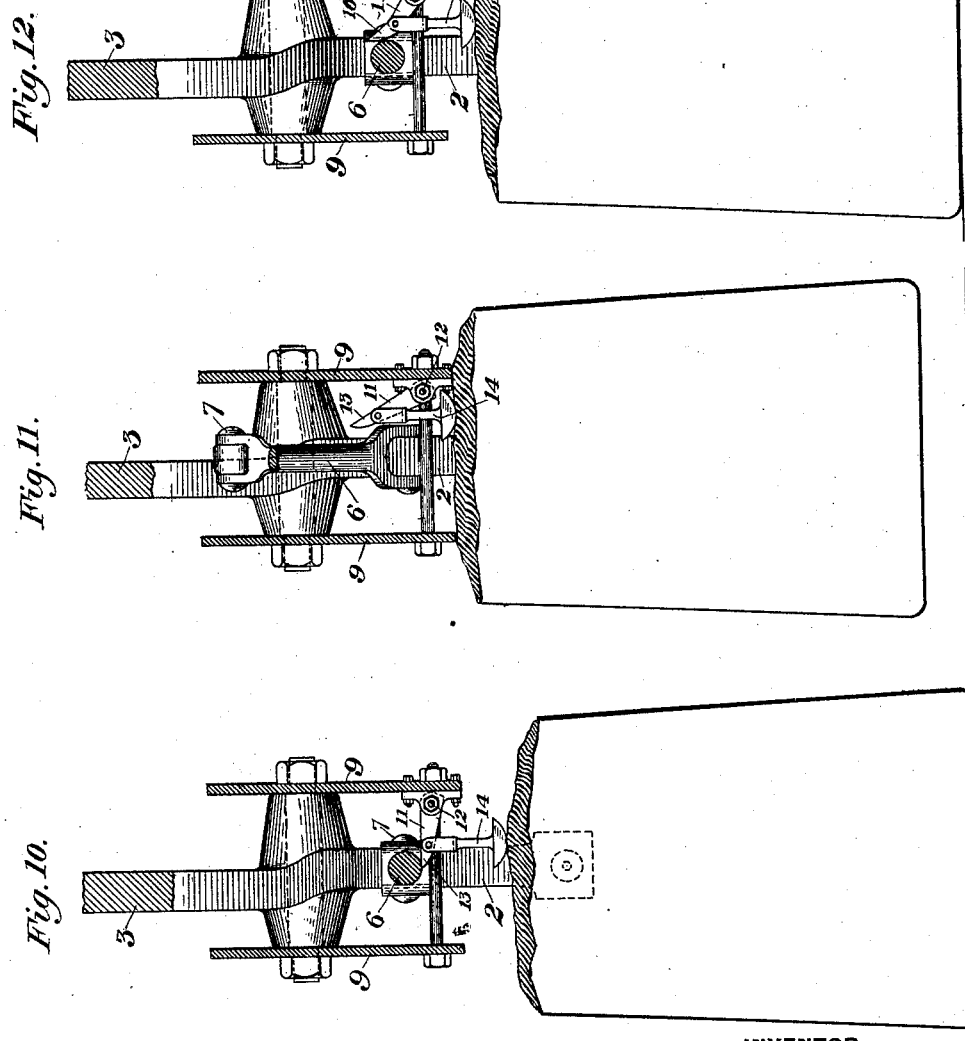

(No Model.)  5 Sheets—Sheet 5.
W. A. CORNELIUS.
TONGS.
No. 472,436.  Patented Apr. 5, 1892.
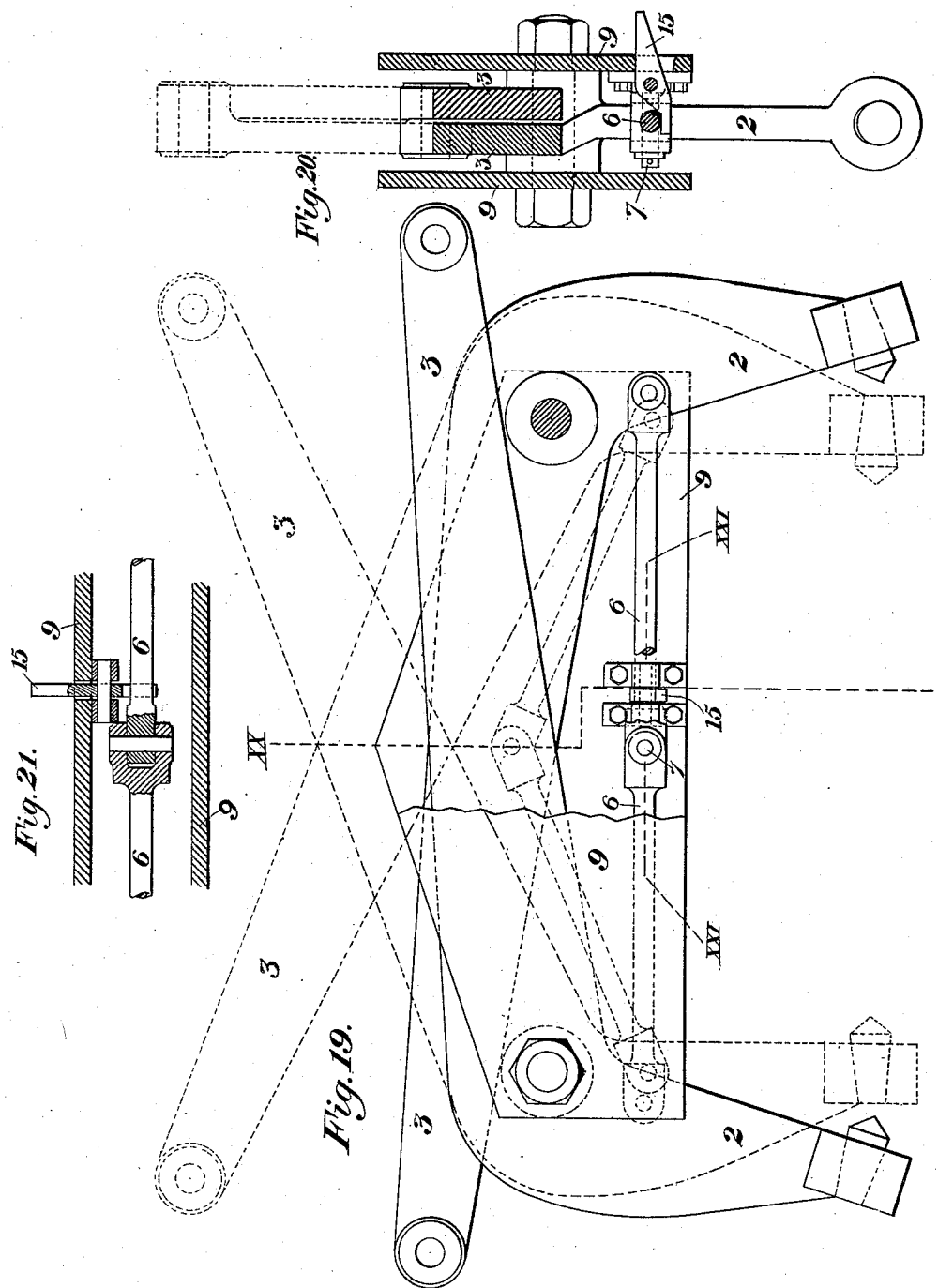
WITNESSES.
N. M. Corwin.
W. B. Corwin.
INVENTOR.
William A. Cornelius
by W. Bakewell & Sons
his Attorneys

UNITED STATES PATENT OFFICE.

WILLIAM A. CORNELIUS, OF PITTSBURG, ASSIGNOR OF ONE-HALF TO JAMES PURVES, OF MUNHALL, PENNSYLVANIA.

TONGS.

SPECIFICATION forming part of Letters Patent No. 472,436, dated April 5, 1892.

Application filed December 26, 1890. Serial No. 375,816. (No model.)

*To all whom it may concern:*

Be it known that I, WILLIAM A. CORNELIUS, of Pittsburg, in the county of Allegheny and State of Pennsylvania, have invented a new and useful Improvement in Tongs, of which the following is a full, clear, and exact description, reference being had to the accompanying drawings, forming part of this specification, in which—

Figure 1 shows in side elevation tongs of a construction now commonly employed for lifting ingots and other burdens and not of my invention. Fig. 2 is a similar view of tongs embodying my invention. Fig. 3 is a plan view of the jointed arms 6 of Fig. 2. Fig. 4 is a side view of the outer end of one of said arms. Fig. 5 is a side elevation of my improved tongs somewhat differently constructed. Fig. 6 is a plan view of the arms 6 used in the tongs of Fig. 5. Fig. 7 is a sectional view showing in side elevation tongs of a modified construction, this view being shown as if in section on the line VII VII of Fig. 9. Fig. 8 is a view similar to Fig. 7, showing the parts of the tongs locked open, whereas Fig. 7 shows them closed. Fig. 9 is an end view of the tongs of Fig. 7. Fig. 10 is a vertical cross-sectional view showing another modification of my improved tongs, the parts of which are locked open. Fig. 11 is a similar view showing the tongs closed on an ingot. Fig. 12 shows the tongs when locked open and in the act of leaving their burden. Figs. 13, 14, 15, 16, 17, and 18 are detail views of parts of the tongs of Figs. 10, 11, and 12, Figs. 13, 15 and, 17 being plan views of parts, and Figs. 14, 16, and 18 being, respectively, side views of the said parts. Fig. 19 is a side elevation, partly in section, of another modified construction of my invention. Fig. 20 is a vertical section on the line XX of Fig. 19, and Fig. 21 is a horizontal section on the line XXI XXI of Fig. 19.

Like symbols of reference indicate like parts in each.

In Fig. 1 I show tongs of the kind commonly used heretofore for lifting heavy objects, such as metal ingots, boxes, &c. The tong-levers consist of jaws 2, made integral with arms 3, attached by chains 4 to a chain 5 or other means by which they are suspended from a suitable support, such as a crane. When the tongs are suffered to hang freely from the chain 5, the gravity and leverage of the parts cause the jaws to approach. Therefore when the jaws are placed on opposite sides of an ingot or other article the lifting of the chains will cause the jaws to bite the article and to hold it firmly with a pressure varying with its weight. When the article carried by the tongs is deposited, it is necessary to pull the jaws of the tongs open and to hold them so while the tongs are drawn away. This operation, which is illustrated in Fig. 1, is one which in handling hot pieces of metal becomes very arduous and in any case is a source of trouble and annoyance.

My invention is designed to provide easy means for dispensing with the necessity of the manipulation of the tongs above mentioned; and to this end it consists, mainly, in means by which the jaws of the tongs when opened are locked positively and automatically in open position after releasing the load, so that they can be withdrawn freely and can be placed with like freedom in position to grasp another article.

It also consists in certain constructions and arrangement of the parts hereinafter particularly described.

In the drawings I illustrate several forms or modifications of the invention, which I shall now proceed to explain in detail.

In Figs. 2, 3, and 4 the arms 3 of the jaws 2 are connected by chains, as in Fig. 1, and are also connected by toggle levers or arms 6 6, jointed together, as shown in Fig. 3, by a pin 7. The ends of the toggle or jointed arms 6 are forked and pivotally connected to the arms 3, and the forked portions are preferably shaped with inclined bases, as illustrated, which bases are adapted to engage with the arms 3 of the tong-levers when the jointed or toggle arms 6 are in horizontal or nearly horizontal position, said arms 3 serving as stops to arrest any further descent of the arms 6, as hereinafter described. When the tongs are in the act of gripping the burden to be lifted, the jointed arms stand in an upwardly-inclined position. When the burden is deposited on the floor or other support, the tongs are lowered on the burden and the gravity of the arms 3 (which for this purpose may be made sufficiently heavier or longer than the jaws to overbalance them) spreads the jaws and separates them from the burden. When the jaws thus open, the jointed arms 6 descend, and when they reach a position in line with each other or a little below such line their further descent is stopped by engagement of the bases of the forks at their outer ends with the arms 3. This serves to hold or lock the tongs open, as shown in Fig. 2, so that they can be lifted and removed from the load simply by raising the crane or other device from which they are suspended. To grasp an article again, the tongs are placed in position to inclose it, and the jointed arms 6 are then raised by an instrument which may be engaged with a suitable clevis 8 at their middle joint, thus leaving the jaws free to be closed by the action of the chains 4 on the arms 3.

In Figs. 5 and 6 I show a modified construction of the tongs in which the jointed arms 6 connect not the arms 3 but the jaws 2. The action of the tongs in this case is the same, except that when the tongs are closed the arms 6 occupy not an upwardly-inclined but a downwardly-inclined position. Fig. 5 shows the action of the tongs in freeing themselves from an ingot, the tongs being let down on the ingot and the action of gravity causing the arms 6 to be moved upwardly by the ingot to lock the tongs open. When the arms 6 reach a position in line with each other or pass a little above this line into a somewhat inclined position, their further motion is stopped by engagement of the bases of the forks at their outer ends with the jaws 2. This serves to lock or hold the jaws open, said jaws thereby serving as stops, so that they can be lifted and removed from the load simply by raising the suspending-crane. To close the tongs, I may employ a bar or bars 7', which project from the pivot 7. On pulling these bars down the jointed arms are brought into downwardly-inclined positions and the jaws permitted to close. These bars also serve, by bearing on the top of the ingot, to prevent the tongs from tipping laterally, and when the ingot is piped they serve, by bearing on the edges of the piped top, to raise the jointed arms.

In the tongs shown in Figs. 2 and 5 the jaws are pivoted together directly.

In Figs. 7, 8, and 9 I show a modified construction in which they are pivoted separately to a frame 9, composed of parallel plates or bars, and the arms 3 are set so that they shall cross each other, as shown. The jointed arms 6 connect the jaws, as in Fig. 5. In Fig. 7 the tongs are shown in the act of lifting a metal box filled with material for a furnace charge, and the arms 6 are then in an upwardly-inclined position. The action of the tongs in releasing the load is shown in Fig. 8. To release the load, the tongs are lowered, when the gravity of the arms 3 causes them to drop and to spread the jaws. When the arms 6 come to a horizontal position or a little below a horizontal position, they are stopped by engagement with a stop or pin 10, which connects the sides of the frame 9, and thereby lock the tongs open, so that they can be lifted and removed freely. To unlock the tongs, I provide the jointed arms 6 with projecting levers 6', which extend beyond the pivotal connection of the arms with the jaws, so that by pressing down on these projecting levers the arms are raised and the tongs unlocked.

In Figs. 10, 11, and 12 I show a construction of the tongs by which they are adapted not only to release their burden automatically, but to engage it automatically as well. The tongs shown in these figures are constructed similarly to the tongs shown in Fig. 7. 11 is a trigger, which takes the place of the pin 10 or other stop, pivoted to one side of the frame 9 at 12 and having its outer end 13 jointed, so as to be capable of upward motion, but incapable of being moved downwardly relatively to the lever. 14 is a pendent rod, which is pivotally connected to the trigger 11 and which forms one of the parts of said trigger. Fig. 10 shows the parts as they would appear when they are locked open in the positions corresponding to the positions shown in Fig. 8. In order to cause the tongs to automatically engage the burden, they are lowered, thereby causing the rod 14 to bear on the burden and to push upwardly the jointed arms 6, on the under side of which it is situate. As soon as these arms pass the horizontal position they unlock the jaws, leaving them free to be closed upon the burden by lifting of the tongs. The parts then occupy the position shown in Fig. 11. In order to again lock the tongs open when the burden is deposited, the suspending device is lowered, thereby causing the jaws to open and the arms 6 to drop into a horizontal position past the end of the trigger 11, which is then in the upwardly-inclined position shown in Fig. 11 and offers no obstruction to their passage. When the tongs are thus locked open and are raised from the burden, the gravity of the rod 14 and of the trigger causes the trigger to drop below the arms 6 into the position shown in Fig. 10, the tapering of the jointed end 13 permitting it to drop past the arms, as illustrated in Fig. 12.

In Figs. 19, 20, and 21 I show a modified construction of the tongs in which a trigger or lever is used as a means for raising the jointed arms to unlock the tongs. The tongs themselves are constructed similarly to the tongs shown in Fig. 7, with this difference that the jointed arms need not be provided with projecting levers 6'. The function of these levers is performed by a lever 15, which also takes the place of the pin 10 or other stop, pivoted to the frame 9 of the tongs and having its inner end extending under the position of one of the jointed arms. When the tongs are locked open by the jointed arms, they may be unlocked by pushing down on the outer projection of the lever 15, whereupon the inner end of the lever will raise the said arms. In Figs. 20 and 21 and by full lines in Fig. 19 I show the tongs when locked open by the jointed arms. In Fig. 19 I show by dotted lines the position of the parts of the tongs when the jaws are closed.

The devices above described illustrate what I deem to be the best construction of my invention; but it will be understood that many other changes will suggest themselves to the skilled mechanic.

In the following claims I intend to claim generically all the forms of tongs herein described and also to claim specifically the construction shown in Figs. 10, 11, and 12.

I claim as my invention—

1. The combination, with pivoted tong-levers, of automatic locking means connected therewith, said means being constructed and arranged to positively lock the levers in open position when they are lowered into contact with a stationary object, substantially as and for the purposes described.

2. The combination, with the pivoted tong-levers, of toggle-arms connecting them, and a stop constructed and arranged to positively and automatically lock the levers in open position when they are lowered into contact with a stationary object, substantially as and for the purposes described.

3. The combination, with the pivoted tong-levers, of toggle-arms connecting them, and a pivoted stop constructed and arranged to automatically lock the levers in open position when they are lowered into contact with a stationary object, substantially as and for the purposes described.

4. In tongs, the combination, with the pivoted tong-levers, of jointed locking-arms connecting them, means for suspending the tongs, and a trigger having a jointed end and having a projection adapted to engage the burden, substantially as and for the purposes described.

In testimony whereof I have hereunto set my hand this 6th day of December, A. D. 1890.

WM. A. CORNELIUS.

Witnesses:
THOMAS W. BAKEWELL,
W. B. CORWIN.